Oct. 5, 1943.  S. BEHAR  2,330,860
FOOD MIXER SUPPORT
Original Filed Oct. 6, 1938   3 Sheets-Sheet 2

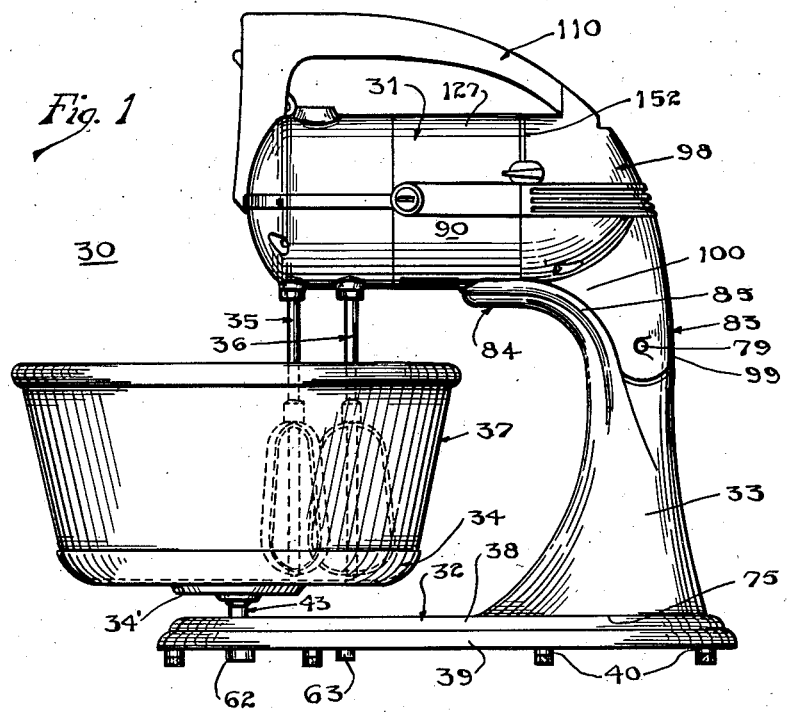
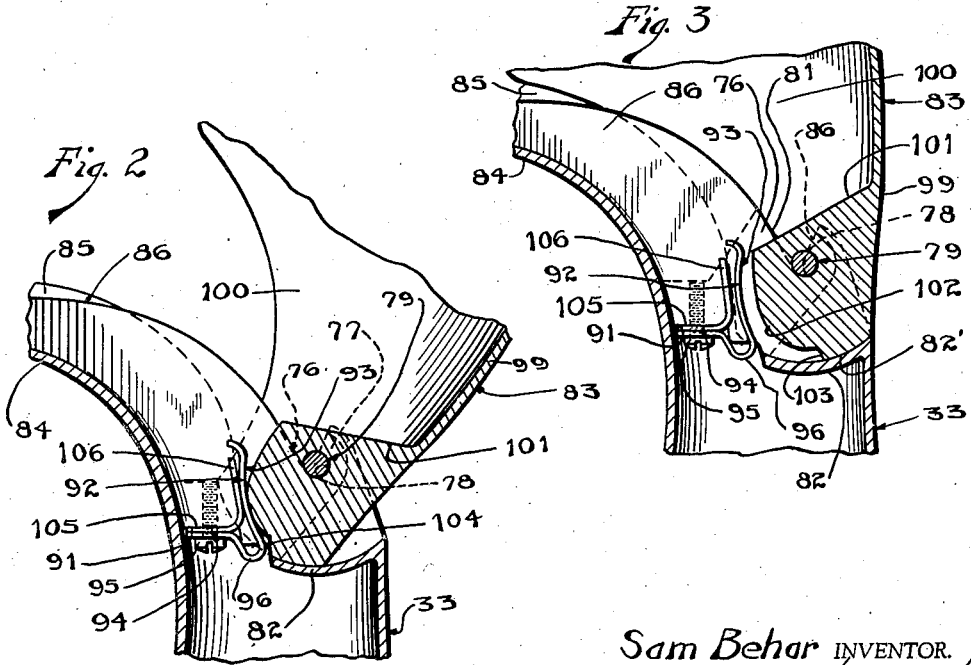

Sam Behar INVENTOR.
BY
His Attorney

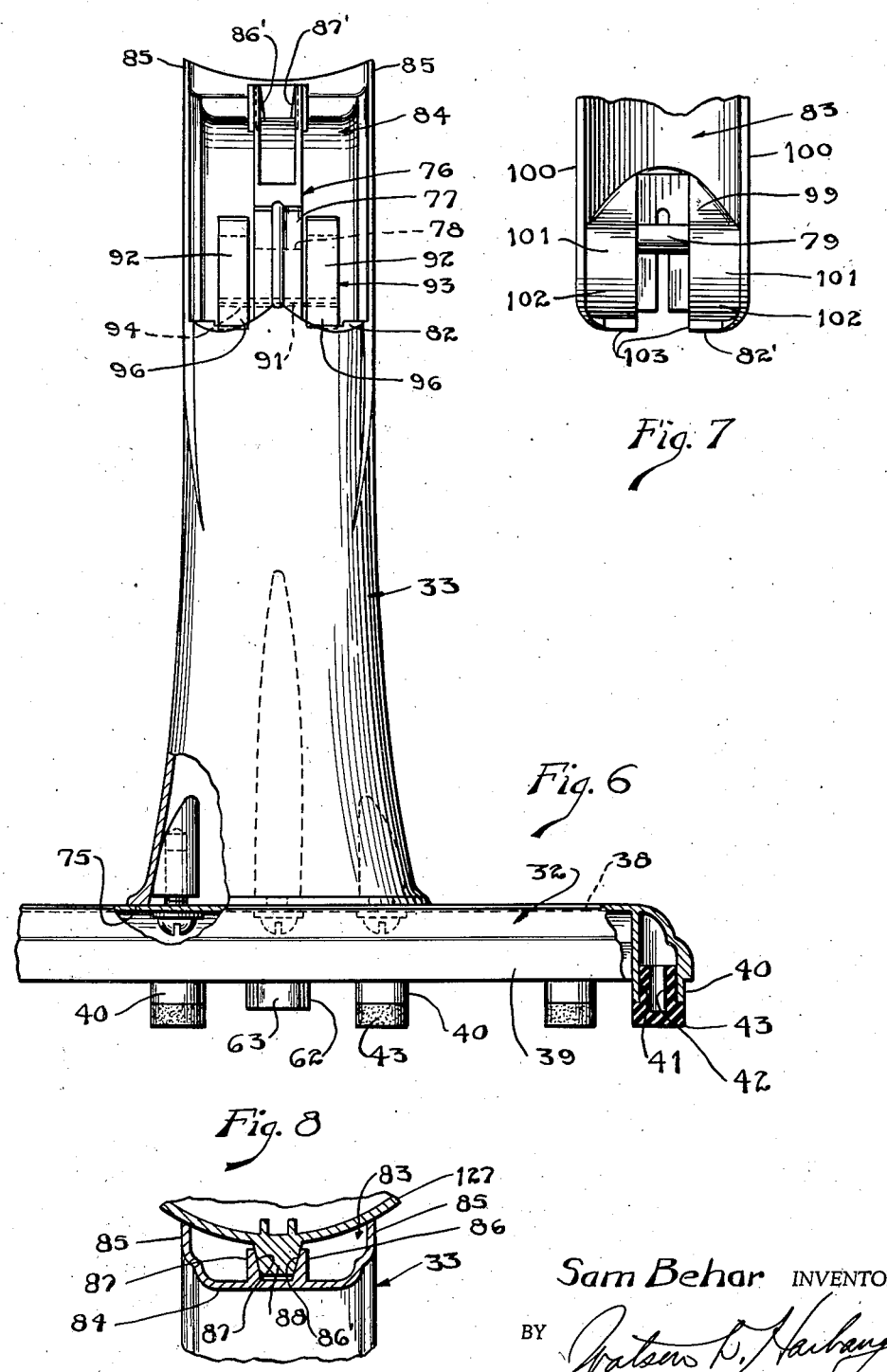

Patented Oct. 5, 1943

2,330,860

UNITED STATES PATENT OFFICE 2,330,860

FOOD MIXER SUPPORT

Sam Behar, Berwyn, Ill., assignor to A. F. Dormeyer Mfg. Co., a corporation of Illinois Original application October 6, 1938, Serial No. 233,541. Divided and this application July 12, 1941, Serial No. 402,201

5 Claims. (Cl. 259—84)

The present invention relates to food mixers, and is particularly concerned with electric food mixers of the household type which are also adapted to drive a multiplicity of other food working attachments.

This application is a division of my application, Serial No. 233,541, filed October 6, 1938, for Electric food mixers, reference to which is hereby made for a fuller understanding of the general construction of the food mixer.

An object of the invention is the provision of an improved electric food mixer in which the driving unit is adapted to be tilted to remove the beaters from the bowl, for removal of the bowl, but in which the motor is adapted to be held at a position above the bowl, by means of a spring arrangement, so that the motor need not be mounted midway of its ends to pivot past its center of gravity, but it may be mounted at its end, and the device may be supported upon a smaller base and made more stable, due to the retention of the motor on the same side of its center of gravity, with respect to its pivotal point on the standard.

Another object of the invention is the provision of an improved standard arrangement for holding the motor unit in working position or in a position above the bowl, for removal of the bowl, which also permits the removal of the motor or driving unit from its support by the handle for operations away from the supporting standard, and in which the standard is provided with an aligning means whereby the motor is accurately aligned and firmly supported when it is placed upon the standard.

Another object of the invention is to provide a combination motor unit and junction box and standard, whereby the beaters are disposed at a predetermined point in relationship to a turntable utilized to support a bowl.

A further object of the invention is to provide an improved support in which the support elements are designed to provide an amply spaced support point for rigid support of the motor during operation, and space to receive connectors which need be available only during initial assembly and for servicing the food mixer.

Other objects and advantages of the invention will be apparent from the following description and the accompanying drawings, in which similar characters of reference indicate similar parts throughout the several views.

Referring now to the figures, in which,

Fig. 1 is a side elevational view of an electric food mixer of the household type embodying the invention, with the mixer in the mixing position on the standard;

Fig. 2 is a fragmentary vertical sectional view, taken through the vertical axis of the standard, showing the mode of pivotal attachment of the motor unit on the supporting standard, with the motor in the backwardly tilted position that is used when the bowl is to be removed;

Fig. 3 is a view similar to Fig. 2, showing the parts in the position which they assume when the beaters are in mixing position in the bowl;

Fig. 6 is a fragmentary sectional view, showing a rear elevation of the top of the standard, with the motor removed;

Fig. 7 is a fragmentary front elevational view of the end of the motor supporting column;

Fig. 8 is a fragmentary sectional view, taken on the line 8—8 of Fig. 4, showing the aligning arrangement for the motor and standard.

Figure 4:
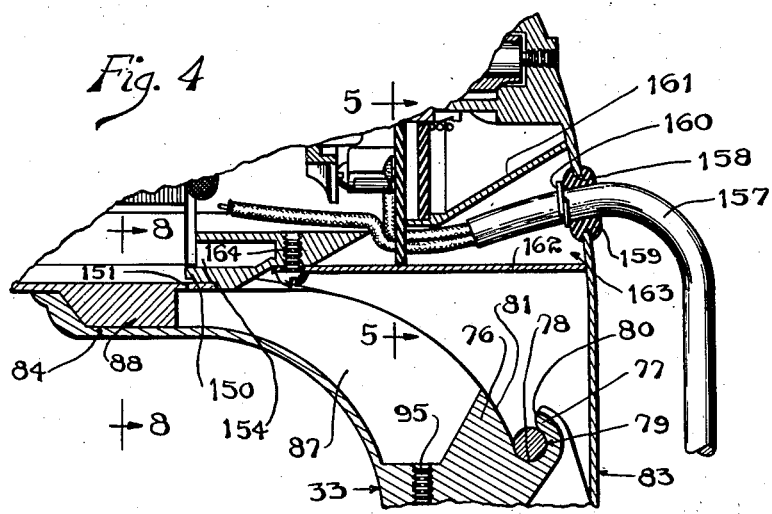
Fig. 4 is a vertical sectional view, taken on a plane passing through the axis of the motor drive shaft limited to a showing of the details of construction of the driving unit for the food mixer.
Figure 5:
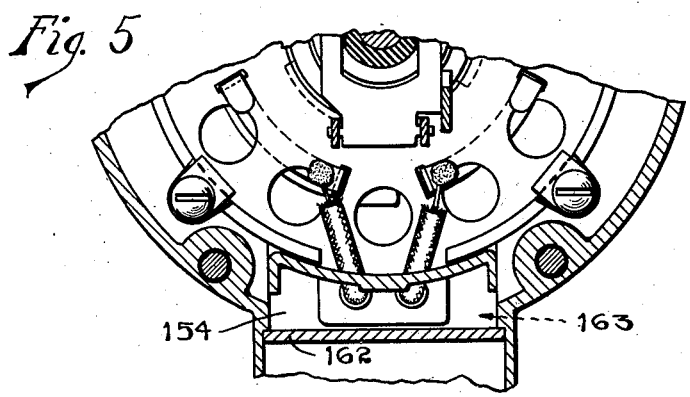
Fig. 5 is another vertical sectional view, taken on the plane of the line 5—5 of Fig. 4, looking in the direction of the arrows, showing other details of construction of the governor.

Referring to Fig. 1, the electric food mixer, which is indicated in its entirety by the numeral 30, preferably comprises an electric motor driving unit 31, a base 32, having a standard 33, turntable 34, beater elements 35, 36, and bowl 37.

The base 32 and standard 33 may be constructed of two separate cast metal pieces, the standard 33 being hollow and secured to the base by a plurality of screws passing through the base and threaded into the standard 33.

The base 32 comprises a cast metal member having a top flange 38 and a depending border flange 39, the latter being provided with a multiplicity of downwardly extending lugs 40, which form legs for the base, and which are provided with internal bores 41 for receiving the reduced cylindrical portion 42 of a rubber foot 43. The area of the base 32 is such that it is adapted to support bowls of any size which are likely to be used, and so that the motor unit 31 is stably supported at all times, and particularly when other attachments are applied to the driving unit. Thus the base 32 extends laterally beyond the end of the driving unit 31, as shown in Fig. 1, and also at both sides of the driving unit 31.

The column or standard 33 comprises a hollow, cast metal member, having a flat bottom edge 75, which engages the top flange 38 of the base 32, to which it is secured by screw bolts, as previously described.

The column 33 tapers toward the top, and by virtue of its enlarged bottom area provides a firmer engagement between the column and base. At its upper end it is provided with an inwardly extending body or tang 76, which is formed with an upwardly extending hook formation or lip 77 surrounding a partially cylindrical groove 78.

The groove 78 is adapted to receive the pivot pin 79 of the motor unit, and there is a sufficient clearance at 80 between the end of the hook 77 and the surface 81 of the lug 76, so that the pin 79 may be removed from its groove 78 by an upward movement when the motor is in the proper position.

The standard also has (Fig. 2) an inwardly extending, partially cylindrical flange 82, located immediately below the motor, and curved on a radius which corresponds to the axis of the pin 79.

The flange 82 closes the upper end of the standard at the pivotal support of the motor and may slidably engage the complementary cylindrical curved surface 82' on the lower end of the motor-supporting bracket or extension 83.

The standard is provided with a forwardly extending arm or extension 84, forming an integral part of the standard, and bordered by the upwardly extending border flange 85 on each side. The arm 84 is also reinforced by a pair of symmetrically located reinforcing ribs 86, 87, which terminate in the lug 76, which bears the hook 77. The reinforcing ribs 86, 87 are spaced from each other to form a recess and are provided with the tapered camming surfaces 86', 87' for engaging a complementary lug or boss 88 carried by the motor housing 90 (Fig. 4) for the purpose of effecting the positive alignment of the motor with the standard arm 84 when the motor is in mixing position.

The standard is also provided with a flat seating surface 91 at the juncture of the arm 84, and the main standard body 33, for supporting a retaining spring 92, which is provided with a pair of retaining arms 93 and an attaching flange 94. The attaching flange is secured to the surface 91 by means of a screw bolt 95 which is threaded into a threaded bore in the standard, and the spring is preferably provided with a pair of upwardly extending arms 93 carried by hair-pin bends 96, one arm being located on each side of the pair of reinforcing flanges 86, 87.

The motor housing 90 has its rear cover member 98 provided with a depending supporting bracket 83, which comprises a rear yoke 99, and a pair of forwardly extending flanges 100.

The flanges 100 and yoke 99 carry at their lower ends a pair of inwardly extending lugs 101 to provide the supporting bracket 83 with sufficient body for carrying the pivot pin 79. The lugs 101 are provided with registering bores for receiving the pivot pin 79, which comprises a cylindrical metal member having a slightly enlarged and knurled surface at one end, so that when it is driven into the bores it is fixedly secured in the supporting bracket 83.

The lugs 101 on the supporting bracket 83 of the motor are spaced sufficiently to receive between them the lug 76 and hook 77 carried by the standard 33. The lugs 101 are provided at their left side (Fig. 3) with the camming surface or detent 102, adapted to engage the tilt-back spring 92. The cam surface 102 engages the spring arm 93 when the parts are in the position of Fig. 2, and forces the spring arm 93 backward until the point of longest radius of the cam 102 passes the line of centers between the supporting bracket 94 of the spring and the pivot pin 79.

At this time a depending stop lug 103 on the motor bracket 83 engages a shoulder 104 on the standard, preventing further backward tilting of the motor, and at this time the motor has been lifted sufficiently so that the beater elements 35 and 36 are above the bowl, so that the bowl 37 can be removed.

The motor 31 does not tilt back far enough to move its center of gravity from the overhanging position of Fig. 1 to a backward position, but the motor is held in the elevated position of Fig. 2 by means of the spring 92.

The tilt-back spring 92 is preferably stiffened by means of an auxiliary stiffening spring 105, having an upwardly extending stiffening arm 106.

The side flanges 100 of the motor-supporting bracket 83 are spaced from each other sufficiently so that they fit between the upwardly extending border flanges 85 on the forwardly extending arm 84 of the standard 33. Thus, when the motor is in the mixing position of Fig. 1, all of the details of construction and mechanism relating to the motor support between the motor and standard are enclosed in the housing which comprises the arm 84, flanges 85, and parts 99, 100.

The motor is firmly supported on the standard and base, but may be very conveniently removed by merely lifting its pivot pin 79 out of the groove 78. When the bowl is to be removed, the motor need only be tilted backward, where it will be held by the retaining spring 92, and the beating elements are then in position so that any drippage drips back into the bowl 37.

Due to the support of the motor 31 at its rear end, a much larger overhang is provided, and larger bowls may be used with any of the devices of the prior art.

The rear cover member 98 is adapted to house the controlling switch structure, the rear armature shaft bearings, and the speed controlling governor. The middle housing or body portion 90 is adapted to house the main motor structure, such as the field and armature, and to support the brushes for the commutator.

Thus, the rear cover member 98 is substantially hemispherical in shape, but slightly pointed, and it is hollow and provided with a reduced cylindrical portion 150, which is adapted to be received within a flange 151 carried by the middle body section 90.

The cable emerges from the rear housing member 98 through a bore 158, protected by a rubber bushing 159, and is anchored by means of a ring of wire 160, which is clamped about the rubber cable 157, inside the housing. The rear housing member 98 also has a lower wall 161, which, with a cover plate 162, forms a connection box 163 for housing the soldered connections between the conductors of the cable 157 and the insulated wires in the housing.

The plate 162 is secured in place by a screw bolt 164 and has the area of the plate 162 such that it fits within the side flanges 100 of the motor-supporting bracket 83, the single screw 164 being adapted to hold it in place.

The present base and stand structure supports the motor at its rear end instead of a point midway between the ends, as in the devices of the prior art; and therefore the motor may be provided with a greater overhang, permitting the use of larger vessels.

Instead of endeavoring to balance the motor upon its pivot, the present motor unit is adapted to be held in elevated position by a spring latching means, and it is not necessary to elevate the motor the same degree in the present device as it is in the devices of the prior art, where the motor must be moved over until its center of gravity is located behind the column.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In an electric food mixer, the combination of a base having an upwardly extending motor-supporting column, with a motor driving unit for a food mixer, said motor driving unit having means for pivotal engagement with said column, said column having an open bearing socket with an overhanging lip to receive said pivotal means whereby the motor may be pivotally supported on the column or may be removed from said column by lifting the motor, and inter-engaging guide members carried by said motor and column at points spaced from said pivot means for aligning said motor with said column with the motor is fixedly secured on said column, said pivot means being located at one end of said motor, and means interengaging the column and motor driving unit for supporting the motor in an elevated position comprising a detent and a spring frictionally engaging the detent to hold the motor driving unit in its elevated position.

2. In a food mixer, a motor housing, a gear housing secured thereto and adapted to receive a downwardly extending agitator therein that develops a lateral force tending to rotate the housing when operating under working conditions, a support forwardly arched at its upper end, said motor housing having intermediate its ends a downwardly extending tapering boss engaging in a correspondingly tapered socket upon the forward end of the support and cooperating therewith to force the housings rearwardly with respect to the support under weight loads, a downwardly extending portion at the rear end of the motor housing provided with two horizontally spaced lugs interconnected by a horizontal pin disposed well below the motor housing, said column having a tang receivable between said horizontally spaced lugs and provided with an open bearing with an overhanging lip that receives said pin only when the pin is moved downwardly and rearwardly, beaters, tapering boss and spaced lugs forming a triangle wherein the housing is supported against relative rotation induced by the beaters at vertically and horizontally spaced points by the lug and socket engagement automatically wedging itself tightly under working conditions, yet freely disengageable by a direct upward and slightly forward lift of the housing, and a handle for manually balancing said housings to provide the requisite upward lift.

3. In an electric food mixer, the combination of an upwardly extending motor supporting column member and a driving unit member for a food mixer, means upon one of the members for pivotally supporting the driving unit member upon the column member for relative tilting about a horizontal axis, the other of said members having an open bearing socket for said pivotal means opening in a generally vertical direction with said pivotal means engaging the socket when the members are moved towards each other in a generally vertical direction and said engagement being released when the driving unit member is lifted directly upward from its working position, a lip overhanging the socket interengaging guide members carried by said members at spaced points from said pivot means for aligning said members with respect to each other when the pivot means is located in said socket, said guide members including weight supporting walls disposed at an angle to the vertical tending to displace the members horizontally at the socket to hold the pivot means under said lip when the members are disposed in their working position.

4. In a food mixer having a bowl, a motor housing, a support, and a gear housing on the motor housing driving a depending beater on the bowl in a manner developing a lateral force, the combination of a weight bearing couple between a portion of the motor housing and a forwardly arched portion of the upper end of the support overhanging the bowl including a tapered boss upon one of the portions engaging in a tapered recess in the other portion mutually cooperating to force the motor housing rearwardly under the weight of the housings, a downward extension at the rear end of the motor housing engaging an extension upon the support, one of said extensions having horizontally spaced lugs mating with a tang upon the other extension and including a horizontal pin upon one of the extensions located well below the motor housing, and the other extension being provided with an open bearing socket receiving the pin, said bearing opening in a generally vertical direction to receive the pin only when the pin and socket approach each other vertically, said beater, tapered boss and spaced lugs forming a triangle wherein the housing is supported against the effort imposed by the beater at vertically and horizontally spaced points whereby said boss and recess automatically wedge tightly under working conditions, yet are freely disengageable by a vertical separation by a lifting of the housing vertically from the support, and a handle for lifting said housing from the support.

5. In an electric food mixer, the combination of a base defining a major axis and having an upwardly extending column at one end, a motor unit overhanging the base and adapted to receive a plurality of interdigitating beaters driven by the motor and depending therefrom in a bowl mounted upon the base, the shafts of the beaters being spaced from one another longitudinally of the major axis, means for pivotally mounting the motor unit on said column comprising an open bearing socket upon one and a socket engaging element upon the other of said column and motor unit, said socket opening substantially vertically and having an overhanging lip whereby said motor may optionally be pivotally moved about a horizontal axis or moved rectilinearly vertically to move the beaters in an out of the mix in the bowl simultaneously, means for holding the socket engaging element in the socket under the lip when the motor is tilted whereby the base may be lifted by means of the motor, and interengaging guide elements carried by said motor and column at points spaced from said socket for aligning the motor and column when the beaters are disposed in the bowl.

SAM BEHAR.